US008632350B2

(12) United States Patent
Uesaka et al.

(10) Patent No.: US 8,632,350 B2
(45) Date of Patent: Jan. 21, 2014

(54) CARD CONNECTOR

(75) Inventors: Ryo Uesaka, Ebina (JP); Masamitsu Takasaki, Yamato (JP); Yuji Naito, Yamato (JP); Mitsuhiro Tomita, Yamato (JP)

(73) Assignee: Molex Incorporated, Lisle, IL (US)

( * ) Notice: Subject to any disclaimer, the term of this patent is extended or adjusted under 35 U.S.C. 154(b) by 7 days.

(21) Appl. No.: 13/542,954

(22) Filed: Jul. 6, 2012

(65) Prior Publication Data
US 2013/0012070 A1  Jan. 10, 2013

(30) Foreign Application Priority Data
Jul. 6, 2011  (JP) .................................. 2011-149635

(51) Int. Cl.
*H01R 13/62* (2006.01)
(52) U.S. Cl.
USPC ........................................................ 439/159

(58) Field of Classification Search
USPC .......................... 439/157–159, 188, 629, 630
See application file for complete search history.

(56) References Cited

U.S. PATENT DOCUMENTS

| | | | |
|---|---|---|---|
| 8,262,397 B1 * | 9/2012 | Van Der Steen .............. | 439/159 |
| 8,393,910 B2 * | 3/2013 | Matsumoto et al. .......... | 439/159 |
| 8,419,454 B1 * | 4/2013 | Ji et al. .......................... | 439/159 |
| 8,460,019 B2 * | 6/2013 | Lai ................................ | 439/159 |
| 8,496,490 B2 * | 7/2013 | Takai ............................ | 439/159 |

* cited by examiner

*Primary Examiner* — Khiem Nguyen
(74) *Attorney, Agent, or Firm* — Timothy M. Morella

(57) ABSTRACT

A slide member includes a side edge holding part, which extends towards the front end edge of the housing, and a front end holding part, which is connected to the front end of the side edge holding part and extends in the transverse direction of the housing. The slide member is able to slide forward and backward along one side edge of the bottom wall part of the housing. The housing contains a mistaken insertion prevention convex part which the front end or rear end of a mistakenly inserted card contacts.

12 Claims, 11 Drawing Sheets

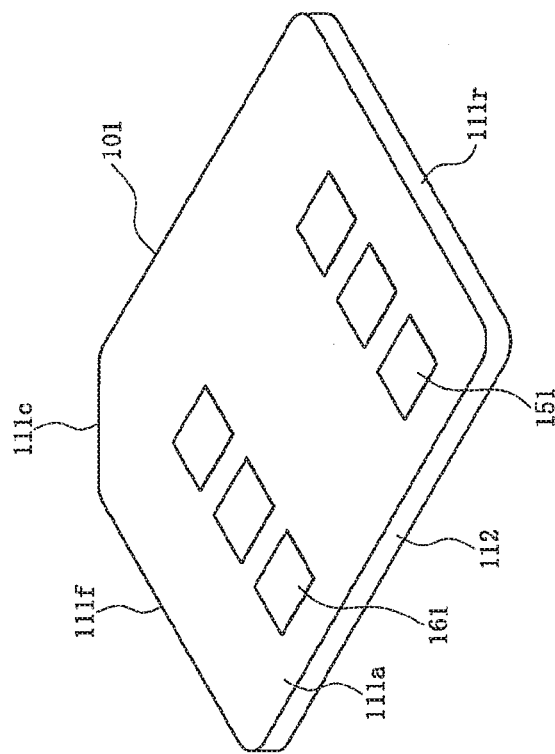
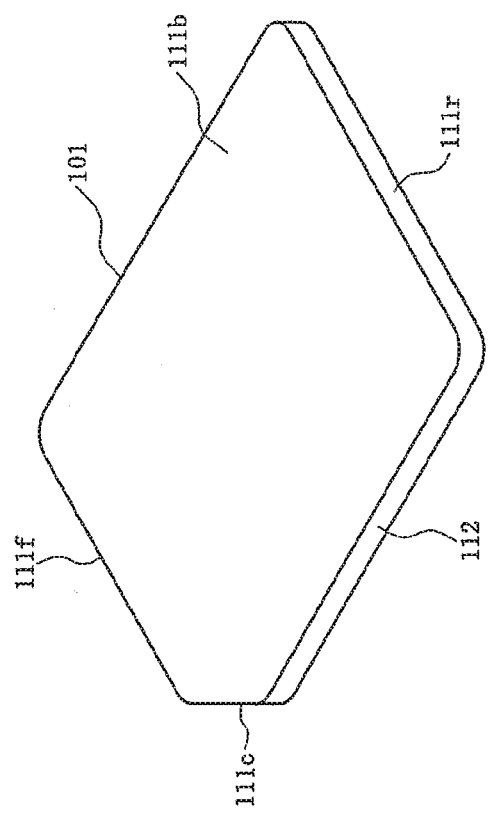
FIG. 4B
FIG. 4A

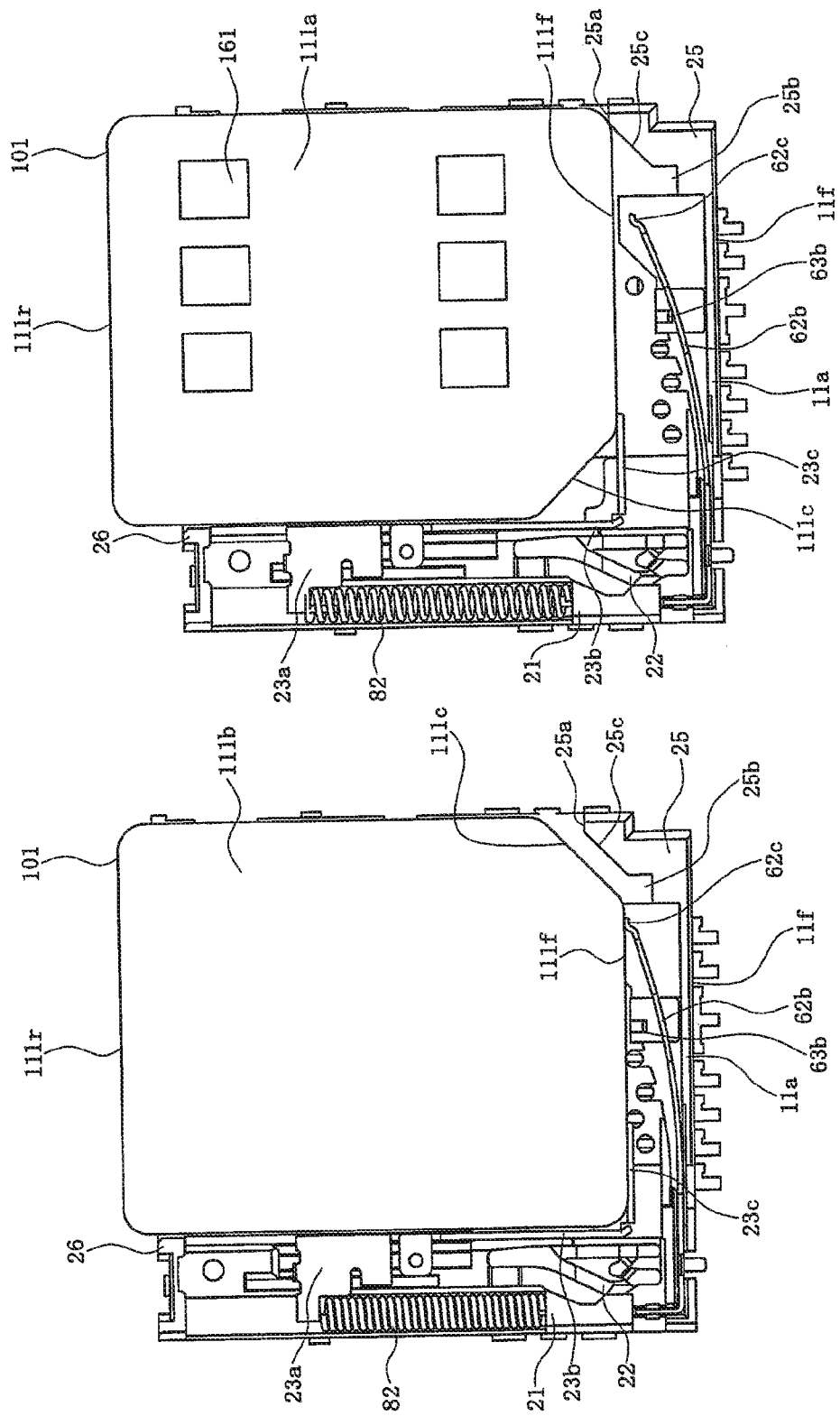

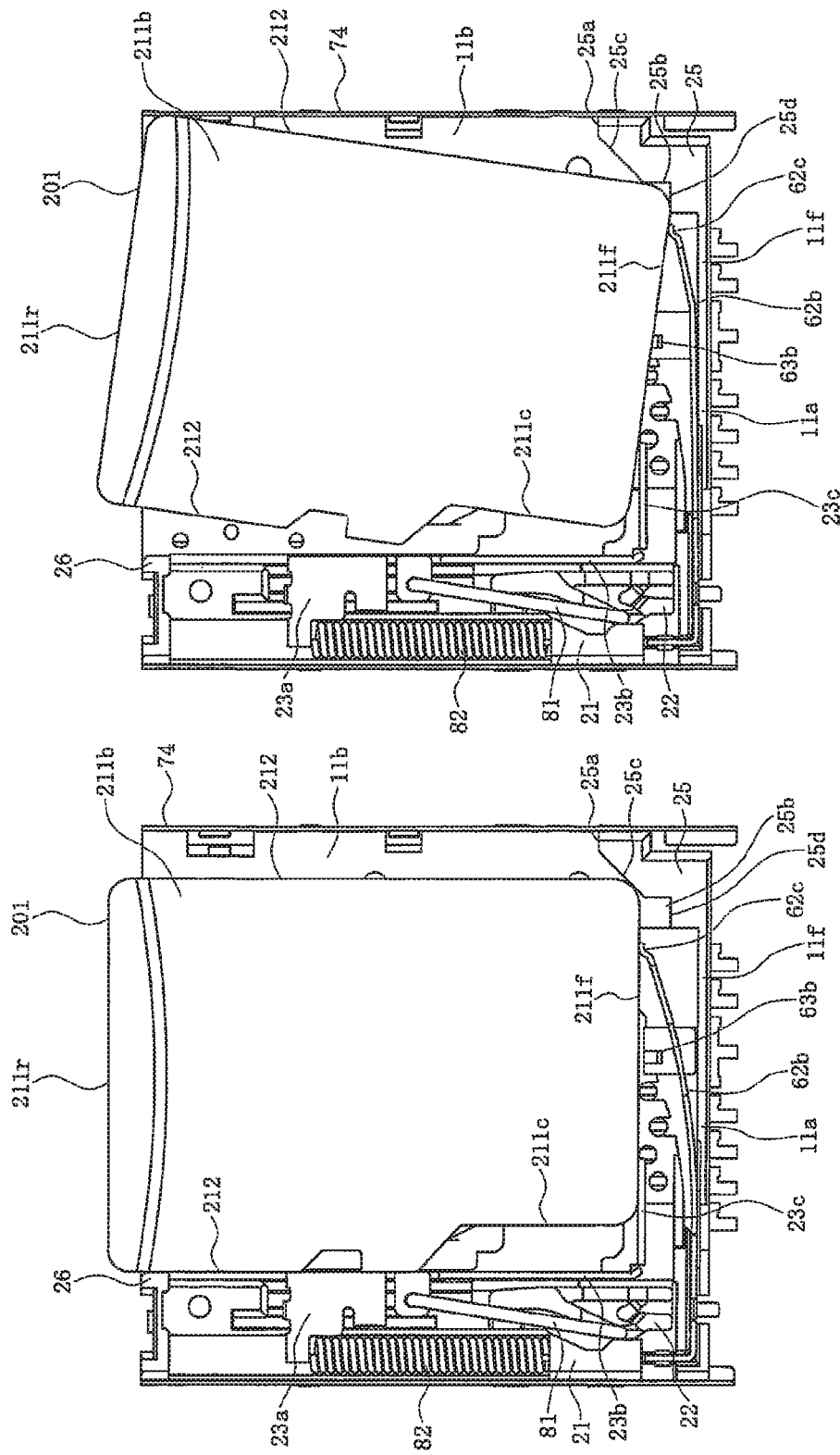

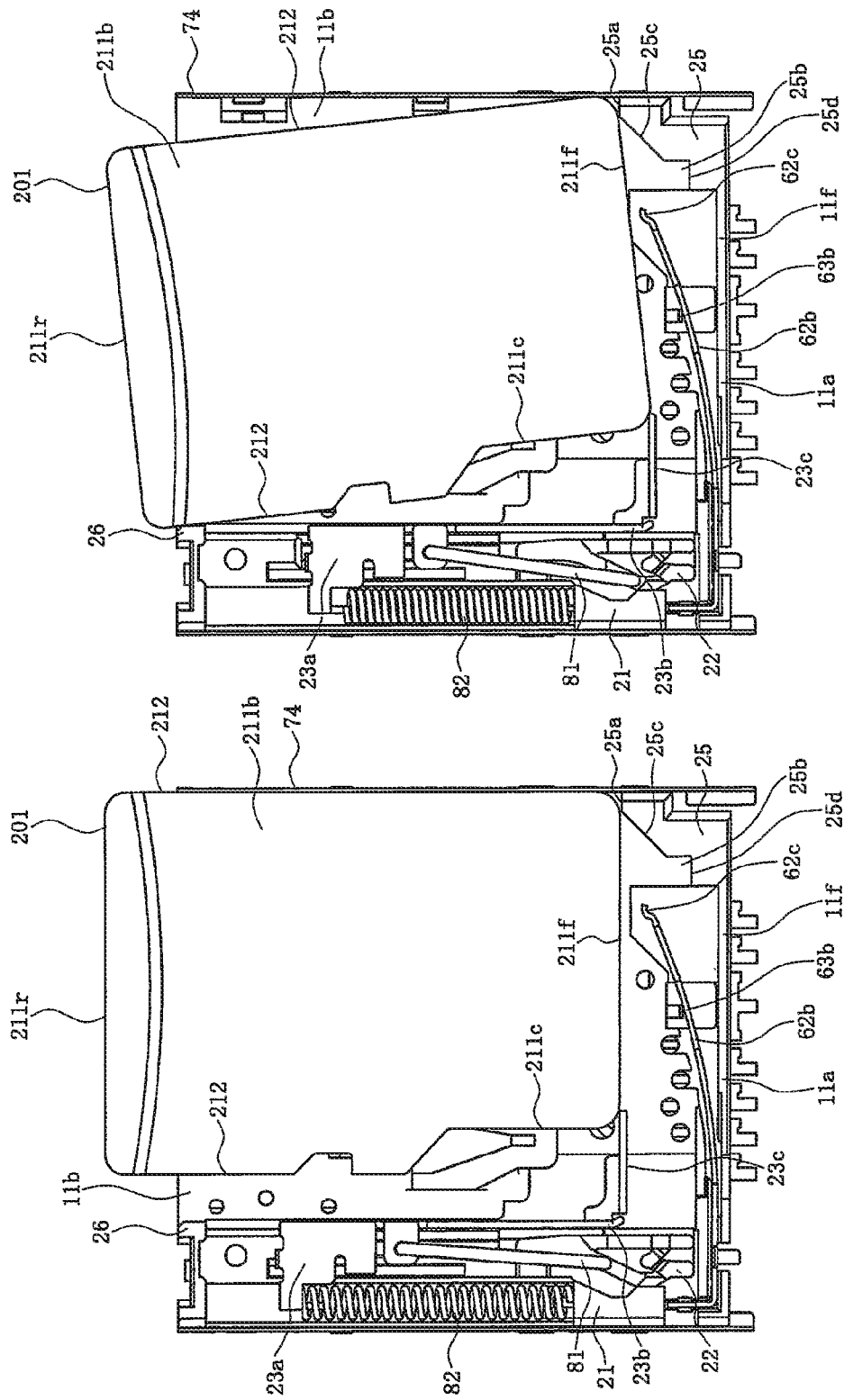

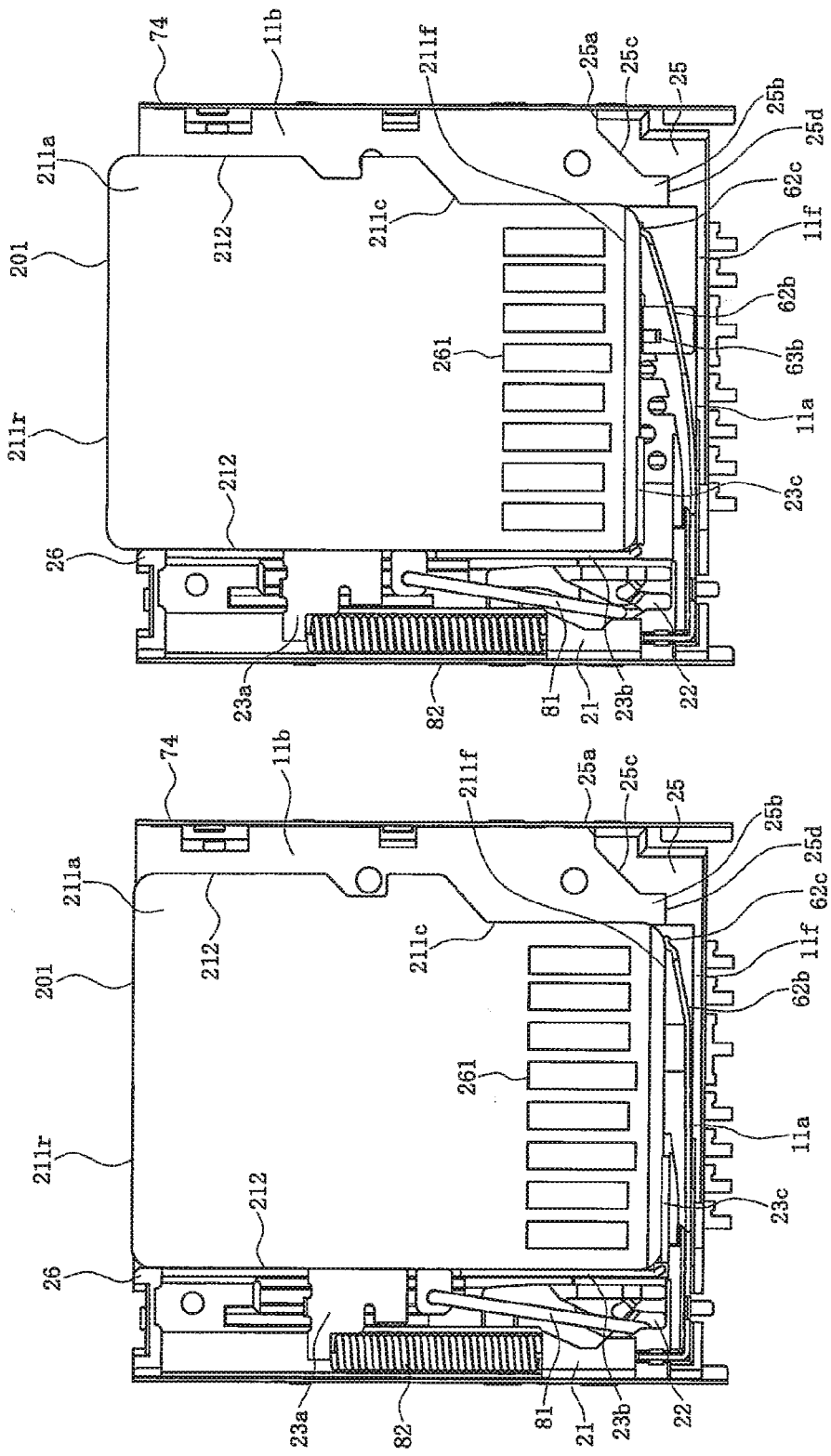

CARD CONNECTOR

REFERENCE TO RELATED APPLICATIONS

The Present Disclosure claims priority to prior-filed Japanese Patent Application No. 2011-149635, entitled "Card Connector," filed on 6 Jul. 2011 with the Japanese Patent Office. The content of the aforementioned Patent Application is incorporated in its entirety herein.

BACKGROUND OF THE PRESENT DISCLOSURE

The Present Disclosure relates, generally, to a card connector, and, more particularly, to a card connector which can prevent the mistaken insertion of a card, and allow a card which has been mistakenly inserted to be removed.

Traditionally, card connectors have been provided in electronic devices in order to use memory cards. In recent years, with the rapid miniaturization of electronic devices, both memory cards and card connectors have shown a tendency toward miniaturization as well. Moreover, card connectors are frequently disposed in locations which are comparatively hard to see (i.e., on the sides, backs, etc. of the devices, as well as out-of-the-way of the locations where the front displays, operating buttons, etc. are disposed). Therefore, the cards may sometimes be inserted incorrectly. In addition, when the cards are so inserted, since parts other than the pads on the outsides of the cards touch the connecting terminals of the card connector, these terminals can be bent or broken. Therefore, card connectors, which prevent the incorrect insertion of cards, have been devised. An example of such a connector is disclosed in Japanese Patent Application No. 2002-039415, the content of which is incorporated in its entirety herein.

FIG. 11 illustrates an enlarged perspective view of a portion of the slider of a conventional card connector. In the drawing, slider 823, made from an insulating material, is a part that is attached to the housing of the card connector in such a way that it can slide, and it slides together with the card that is inserted into the card connector. This slider 823 is provided with a main part 823b, which extends in the sliding direction along the side edge of the card, and a holding part 823c, which extends in the transverse direction of the card connector along the front edge of the card and is connected so that it is perpendicular to the front end of the main part 823b.

Moreover, an inclined contact part 824, which touches the inclined surface, is formed in such a way than a corner on one end of the front end of the card is cut out. Furthermore, a rod-shaped elastic deforming part 826, which extends along the main part 823b, starting from the holding part 823c, is formed. This elastic deforming part 826 does not touch the inclined face of the card when this inclined face touches the inclined touching part 824, but it is formed to a length such that it touches this corner when the corner on the other end of the front edge of the card has been inserted along the main part 823b. Furthermore, it is formed in such a way that, when the corner has been inserted along the main part 823b, the corner does not touch the inclined contact part 824; thus, a surface 825 is formed, which is almost perpendicular to the direction in which the elastic deforming part 826 extends.

Moreover, when the card has been inserted in the appropriate way—that is, when it is inserted correctly—the inclined face part, formed in the corner on one end of the front edge of the card, touches the inclined touching part 824, the front edge of the card is held in the holding part 823c, and the side edge of the card is held by the main part 823b. Therefore, the slider 823 slides in the direction in which the card is inserted, along with the card.

On the other hand, when the card has been inserted in an incorrect way—that is, when it is inserted upside down—the corner on the other end of the front edge of the card touches the front end of the elastic deforming part 826 and it rides up on the inclined surface 826a which was formed on this front end. Therefore, the front end of the elastic deforming part 826 is elastically displaced downward, and a stopping projection 826b, formed on the opposite side of the inclined surface 826a, engages with a stopping concave part, formed in the bottom surface of the housing (not shown). Therefore, the slider 823 is not able to slide, and thus further advance of the card is prevented. In this way, the connecting terminals inside the card connector, etc., can be prevented from being injured by the wrongly inserted card.

However, in the conventional card connector, when a card of a kind which the card connector is made to be used with—that is, a card of the correct kind—is inserted in an incorrect fashion, the insertion of the card can be prevented, but when a card of a kind for which the card connector is not made, that is an incorrect kind, and one which is smaller than the correct kind of card, is inserted, the insertion of the card cannot be prevented. In recent years, many kinds of cards have been marketed. Therefore, users may try to insert different kinds of cards into the card connector, mistaking them from the correct kind In particular, if a different kind of card has the same length as the correct kind of card but a smaller width than the correct one, it will not touch the front end of the elastic deforming part 826; therefore, insertion of it into the card connector cannot be prevented. Moreover, if it has been inserted deeply into the card connector, the position of the card is not stable; therefore, the card may be caught in the housing in such a way that it cannot be extracted.

SUMMARY OF THE PRESENT DISCLOSURE

The purpose of the Present Disclosure is to solve the aforementioned problems with conventional card connectors, and to provide a highly reliable card connector, which can reliably prevent mistaken deep insertion of a card by means of a simple constitution, and allow a card that has been mistakenly inserted to be reliably removed.

Pursuant to the Present Disclosure, the card connector herein includes a housing which encloses the card which is provided with a terminal member, a connecting terminal which is installed in this housing and contacts the terminal member of the card, a slide member which holds the card which has been inserted into the housing and slides, and a biasing member which biases this slide member in the opposite direction to the direction of insertion of the card. The card connector has a card guiding mechanism, by means of which, when the card is maintained in a state in which it is held in the locked position and the terminal member of the card contacts the connecting terminal, and the card is moved in the insertion direction by a pushing action in which the card, held in this locked position, is pushed in the insertion direction and it reaches the overstroke position, the card is moved from the overstroke position, in the direction opposite to the insertion direction, and ejected, and the card connector also has a cover member which is attached to the housing and covers the housing and at least part of the card which has been inserted into this housing. The slide member includes a side edge holding part which extends towards the front end edge of the housing and a front end holding part which is connected to the front end of this side edge holding part and extends in the transverse direction of the housing; it is able to slide forward and backward along one side edge of the bottom wall part of the housing. The housing also includes a convex part that prevents mistaken insertion, which is formed on the opposite side from the slide member in the front end edge and which is contacted by the front end or rear end of the card that has been mistakenly inserted.

In another card connector of the Present Disclosure, the convex part, which prevents mistaken insertion, includes an inclined part, which is cut out diagonally The card contains an inclined part which is formed on one end of its front end. When the card is correctly inserted, this inclined part is opposite the inclined part of the convex part, which prevents mistaken insertion. In still another card connector of the Present Disclosure, in addition, at least the tip end of the front end holding part makes contact in a range outside the inclined part in the front end of a card that has been mistakenly inserted upside down. In still another card connector of the Present Disclosure, in addition, the housing includes an insertion opening convex part formed in the slide member side in the rear end edge; if an incorrect card of a different kind from the card, with a narrower width than the card, is mistakenly inserted, the insertion opening convex part or the side plate part of the cover member contacts the side edge of the incorrect card and controls the inclination of the incorrect card in the transverse direction.

By means of the Present Disclosure, a card connector can reliably prevent mistaken deep insertion of a card by means of a simple constitution and allow a card that has been mistakenly inserted to be reliably removed, and reliability can be increased.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which:

FIG. 4 is a perspective view of a card which has been inserted into the card connector of FIG. 1, in which (a) is a perspective view from above, and (b) is a perspective view from below;

FIG. 5 is a first front view of the card connector of FIG. 1 with the shell removed, showing the operation of inserting a correct kind of card, in which (a) is a view showing the operation of correct insertion, and (b) is a view showing a first operation of mistaken insertion;

FIG. 7 is a first front view of the card connector of FIG. 1 with the top plate part of the shell removed, showing the operation of inserting an incorrect kind of card, in which (a) is a view showing a first operation of mistaken insertion, and (b) is a view showing a second operation of mistaken insertion;

FIG. 8 is a second front view of the card connector of FIG. 1 with the top plate part of the shell removed, showing the operation of inserting an incorrect kind of card, in which (a) is a view showing a third operation of mistaken insertion, and (b) is a view showing a fourth operation of mistaken insertion;

FIG. 9 is a third front view of the card connector of FIG. 1 with the top plate part of the shell removed, showing the operation of inserting an incorrect kind of card, in which (a) is a view showing the overstroke position in the fifth operation of mistaken insertion, and (b) is a view showing the locked position in the fifth operation of mistaken insertion;

DESCRIPTION OF THE PREFERRED EMBODIMENTS

Figure 1:
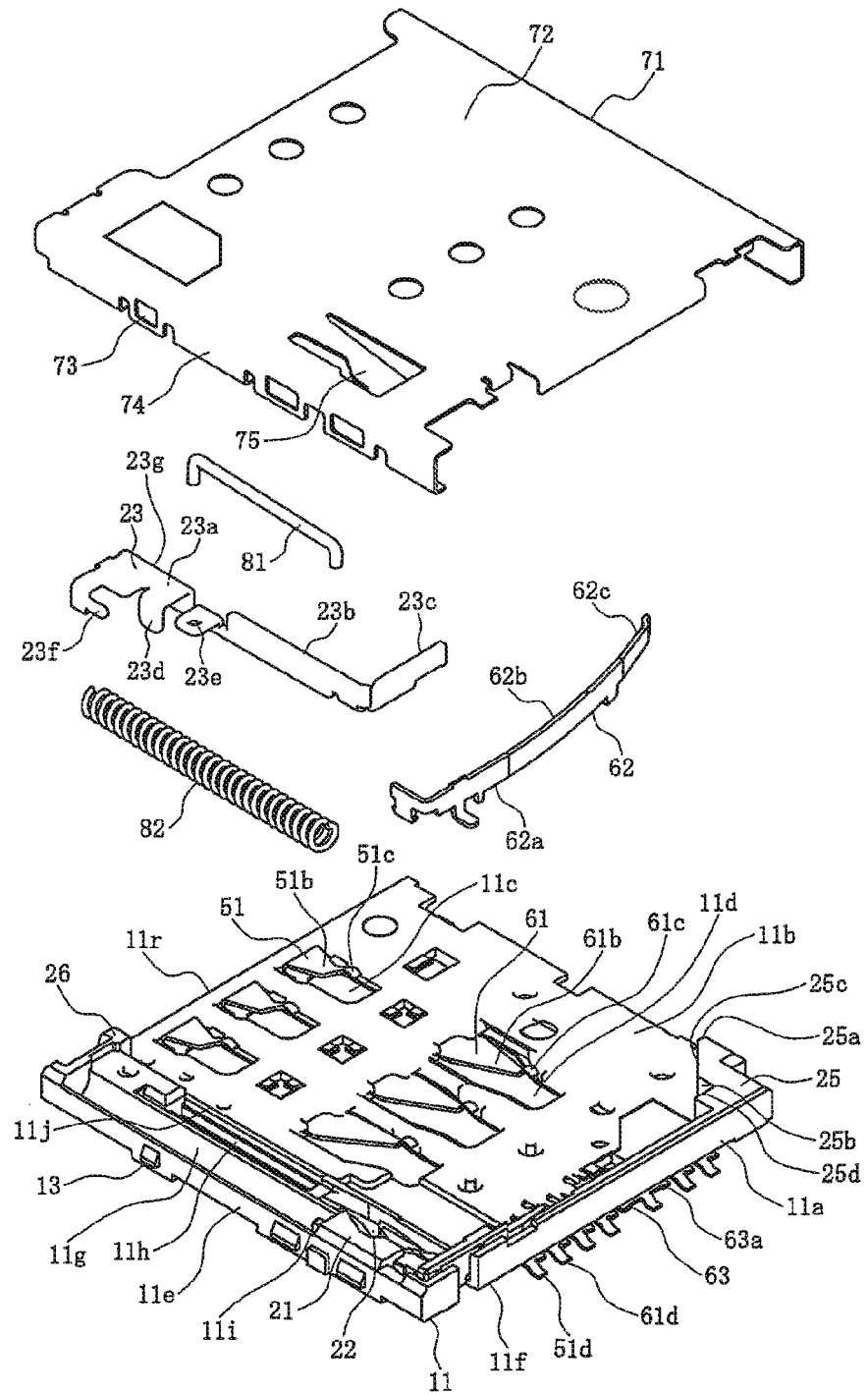
FIG. 1 is an exploded view of a card connector according to the Present Disclosure.

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Referring to the Figures, a card connector 1 is installed in an electronic device (not shown). Moreover, a card 101 is inserted into the card connector 1. The card 101 is fitted into the electronic device through the card connector 1. Although the card 101 may be any type of memory card, in the Present Disclosure, it is assumed that the card is a microSIM card.

The card 101, as shown in FIG. 4, has an approximately rectangular plate shape. A plurality of front contact pads 161, as electrode pads which are terminal members, are disposed in a line along the front end 111f of the lower surface 111a. Moreover, a plurality of rear-end contact pads 151, as electrode pads which are terminal members, are disposed in a line along the rear end 111r of the lower surface 111a. Thus, the electrode pads are disposed in such a way that they form two lines extending in the transverse direction of the card 101. The contact pads are not disposed on the upper surface 111b. In addition, a cut-off part 111c, as an inclined part cut diagonally, is formed in one corner part which connects the right and left ends of the front end 111f; specifically, in the upper left corner in the upper surface 111b.

The card connector 1 has a housing 11, formed integrally by an insulating material, and a shell 71, formed integrally by working a plate member consisting of a conductive material and attached to the upper side of the housing 11 as a cover member. This shell 71 covers at least part of the housing 11 and the card 101 inserted into the housing 11. Moreover, the card connector 1 is provided with a roughly flat rectangular parallelepiped shape. It is attached to the electronic device, and the card 101 is inserted into the housing 11 from the insertion opening 18 in the rear (the upper left in FIG. 2). Thus, the card 101 is inserted into the space formed between the housing 11 and the shell 71.

As shown, the housing 11 has a bottom wall part 11b, which is an approximately rectangular flat plate member, and an inner wall part 11a, which extends along the front edge in the direction of insertion of the card 101 in the housing 11—that is, along the front end edge 11f—and rises from the bottom wall part 11b. The bottom wall part 11b is provided with rear-terminal-holding concave parts 11c, as terminal-holding concave parts, which hold the rear terminals 51 as the rear connection terminals disposed on the rear side, among the connecting terminals, and front-terminal-holding concave parts 11d, as terminal-holding concave parts, which hold the front terminals 61 as the front connection terminals disposed on the front side, among the connecting terminals. The rear terminal-holding concave parts 11c are openings which pass through the bottom wall part 11b in the direction of the plate thickness, disposed in a line in such a way as to form a line which extends in the transverse direction of the housing 11 along the rear edge in the direction of insertion of the card 101 in the housing 11; that is, along the rear end edge 11r. Moreover, each rear terminal 51 is enclosed in a rear terminal-holding concave part 11c. Furthermore, the front terminal-holding concave parts 11d are openings which pass through the bottom wall part 11b in the direction of the plate thickness, disposed in a line in such a way as to form a line which extends in the transverse direction of the housing 11 between the front-end edge 11f and the rear-end edge 11r of the housing 11. Moreover, each front terminal 61 is enclosed in a front terminal-holding concave part 11d.

In the rear terminals 51, at least parts of their base parts 51a are embedded in the bottom wall part 11b, and the other parts are exposed in the rear terminal-holding concave parts 11c. Specifically, the rear terminals 51 are formed by so-called "over-molding;" that is, the housing 11 is formed by filling an insulating material into the cavity of a mold into which the rear terminals 51 were set beforehand, and at least parts of the base parts 51a are embedded in the bottom wall part 11b and covered with the insulating material which constitutes the bottom wall part 11b. Similarly, for the front terminals 51, at least parts of their base parts 61a are embedded in the bottom wall part 11b, and the other parts are exposed in the front terminal-holding concave parts 11d. Specifically, the front terminals 61 are also formed by so-called "over-molding," and at least parts of the base parts 61a are embedded in the bottom wall part 11b and covered with the insulating material, which constitutes the bottom wall part 11b.

Figure 3:
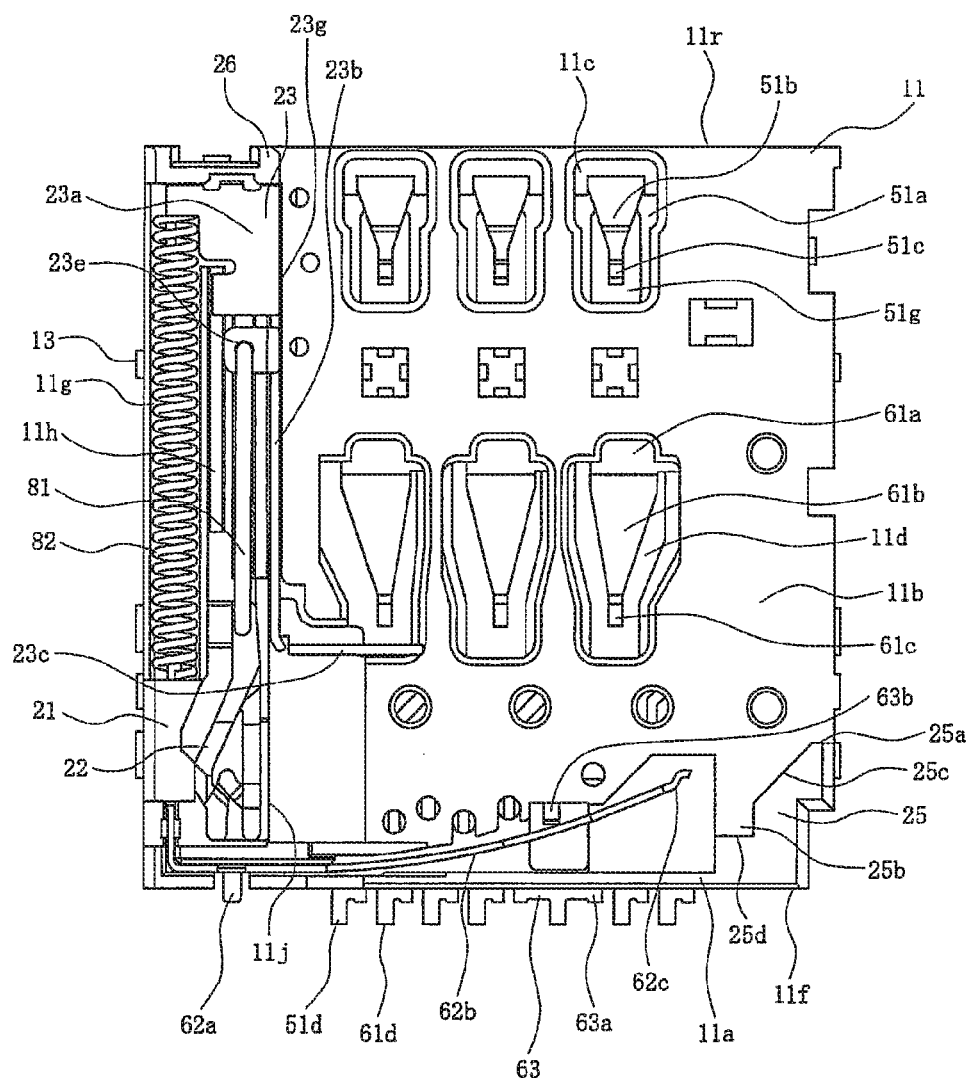
FIG. 3 is a front view showing the state in which the shell of the card connector of FIG. 1 has been removed.

The rear terminals 51 are provided with cantilever-shaped contact arm parts 51b, the ends of which are connected to the base parts 51a, and contact parts 51c connected to the free ends of these contact arm parts 51b; that is, their tips. The base ends of the contact arm parts 51b are placed on the rear-end edge 11r side and their tips extend upwards at an angle, towards the front-end edge 11f; at least the upper surfaces of the contact parts 51c are placed above the upper surface of the bottom wall part 11b, in the state in which the card 101 has not been inserted into the card insertion space. Furthermore, the contact parts 51c are provided with a curved side surface shape, in such a way that it protrudes upward, and their tips face in a downward-angled direction. As shown in FIG. 3, the contact arm parts 51b and the contact parts 51c are placed in the rear terminal-holding concave parts 11c, facing upwards.

The rear terminals 51 include curved parts that protrude downward. They are provided with contact arm support parts (not shown), the lower front ends of which are connected to the rear ends of the base parts 51a and the upper front ends of which are connected to the rear ends of the contact arm parts 51b, and openings 51g formed in the centers of the base parts 51a. In addition, these opening parts 51g, the contact arm support parts that include curved parts, the contact arm parts 51b, and the contact parts 51c are not embedded in the bottom wall part 11b are exposed in the rear terminal-holding concave parts 11c. That is, the rear terminals 51 are fixed by embedding the upper parts and the left and right side parts in the bottom wall part 11b, and the rear parts are not embedded in the bottom wall part 11b and are not fixed.

The front terminals 61 are provided with cantilever-shaped contact arm parts 61b, the ends of which are connected to the base parts 61a, and contact parts 61c connected to the free ends of these contact arm parts 61b, that is, their tips. The base ends of the contact arm parts 61b are placed on the rear-end edge 11r side and their tips extend upwards at an angle, towards the front-end edge 11f. At least the upper surfaces of the contact parts 61c are placed above the upper surface of the bottom wall part 11b, when the card 101 has not been inserted into the card insertion space. Furthermore, the contact parts 61c are provided with a curved side surface shape, in such a way that it protrudes upward, and their tips face in a downward-angled direction. As shown in FIG. 3, the contact arm parts 61b and the contact parts 61c are placed in the front-terminal-holding concave parts 11d, facing upwards.

The front terminals 61 are not provided with parts corresponding to the contact arm support parts. In the base parts 61a, the parts behind the rear ends of their front terminal-holding concave parts 11d are embedded in the bottom wall part 11b and the base ends of the contact arm parts 61b are connected to the front ends of the base parts 61a. Moreover, the contact arm parts 61b are cantilever-shaped members, the tips of which extend upwards at an angle towards the front end edge 11f. They function as springs, being formed longer than the contact arm parts 51b of the rear terminals 51, assuring a sufficient spring length.

In the rear terminals 51 and front terminals 61, the contact parts 51c and 61c are disposed in such a way that they contact the rear contact pads 151 and front contact pads 161 of the card 101, which is held in the card connector 1. Thus, the numbers and forms of disposition of the rear terminals 51 and front terminals 61 may be modified in suitable ways so that they conform to the numbers and forms of disposition of the rear contact pads 151 and front contact pads 161 of the card 101. In the example shown, there are three each of the rear terminals 51 and front terminals 61, and they are disposed in an egg-crate shape, as described herein.

Moreover, one end of a long, narrow, band-shaped connecting part (not shown) is connected to the base part 51a of each rear terminal 51. The connecting part extends in the forward and backward directions of the housing 11 and is embedded in the bottom wall part 11b. Furthermore, the solder tail part 51d extends forward from the other end of this connecting part and is exposed in such a way that it projects forward from the front end edge 11f. Moreover, the solder tail part 51d is electrically connected to the partner side end members; that is, signal wires, contact pads, terminals, etc., formed in the wiring substrate, etc., in the electronic device. In addition, the connecting parts of the rear terminals 51 are disposed in such a way that they pass to the sides of the front terminals 61, placed in front and reach the front end edge 11f.

Similarly, one end of a long, narrow, band-shaped connecting part (not shown) is connected to the base part 61a of each front terminal 61. The connecting part extends in the forward and backward directions of the housing 11 and is embedded in the bottom wall part 11b. Furthermore, the solder tail part 61d extends forward from the other end of this connecting part and is exposed in such a way that it projects forward from the front end edge 11f. Moreover, the solder tail part 61d is electrically connected to the partner side end members.

Furthermore, the housing 11 has a side wall part 11e which extends forward and backward along one of its side edges. A card guide mechanism holding part 11h, a slide cam part 21, and a biasing member receiving part 11g are formed on the inner side of this side wall part 11e. In addition, 11j is a partition wall part, which partitions the side wall part 11e and the space in which the card 101 is inserted and contained—it extends forward and backward. Moreover, the slide member 23 of the card guide mechanism for guiding the card 101, which has been inserted into the card connector, is installed in the card guide mechanism holding part 11h so that it can slide forwards and backwards. In this way, the slide member 23 can slide forward and backward along one side edge of the bottom wall part 11b. Moreover, the slide cam part 21 is a member that functions as a slide cam in the cam mechanism of a heart-shaped cam, in order to perform an operation of the push/push type; a cam groove 22 is formed in its upper surface. Furthermore, a biasing member 82, as a coil spring that exerts a biasing force in its compressed state, is contained in the biasing member receiving part 11g. Furthermore, the rear end surface of the slide cam part 21 functions as a biasing force receiving part, which receives the biasing force of the biasing member 82. In addition, a stop projection 11i, which stops the biasing member 82, is formed, and one end of the biasing member 82 is attached.

The slide member 23 is provided with a card holding part 23a for holding the card 101, a guide part 23d which slides in the grooved card guide mechanism holding part 11h, a cam engaging part 23 in which the other end of a long narrow pin member 81 engages, as a cam member which engages with the cam groove 22, and a stop projection 23f which stops one end of the biasing member 82. In this way, the slide member 23 is biased in the direction opposite to the insertion direction of the card 101—that is, the ejection direction of the card 101—by the biasing member 82. Furthermore, the card holding part 23a includes a long, narrow band-shaped side edge holding part 23b which extends in the forward direction, a long, narrow band-shaped front end holding part 23c which extends in the transverse direction of the housing 11 and is connected to the front end of this side edge holding part 23b, and an inside surface part 23g which extends from the rear end of the card holding part 23a to the front end of the side edge holding part 23b. This inside surface part 23g has a long, narrow band-shaped flat surface that extends in the forward and backward directions, placed on the inner side (the right side in FIG. 3) of the partition wall part 11j, and covering part of the inner side of the partition wall part 11j. Furthermore, the slide member 23 holds the card 101 by the side edge holding part 23b and the front end holding part 23c, and moves forward and backward together with the card 101.

The card connector 1 of the Present Disclosure is generally called a "push-in-push-out type" or a "push/push type," and requires an operation of pushing the card 101 in, both when the card 101 is inserted into the card connector 1 and when the card 101 is removed from the card connector 1. This kind of operation is the same as the alternating operation (position-holding type, push-on-push-off type) in the field of push-button switches. It is made in such a way that the push/push operation is performed on the slide member 23, which moves together with the card 101, by the fact that the pin member 81 and the cam groove 22 work together. In this way, the card guide mechanism is such that, if the card 101 is moved in the insertion direction and arrives at the end point by the pushing operation in which it is pushed in the insertion direction, the card 101 can be moved from the end point in the direction opposite to the insertion direction and ejected by the biasing force of the biasing member 82. Moreover, the slide member 23 is halted in the locked position. In this way, the card 101 is held within the card connector 1.

The pin member 81 is biased downward by the pin pushing member 75 of the shell 71. The pin pushing member 75 is a plate-shaped member provided with a spring property, formed by the fact that part of the shell 71 is bent in the direction of the bottom wall part 11b of the housing 11 so that it can exert pressure. The pin member 81 is placed between the pin pressing member 75 and the slide member 23 or the housing 11, and is held so that it does not come away from the slide member 23 or the housing 11.

Figure 2:
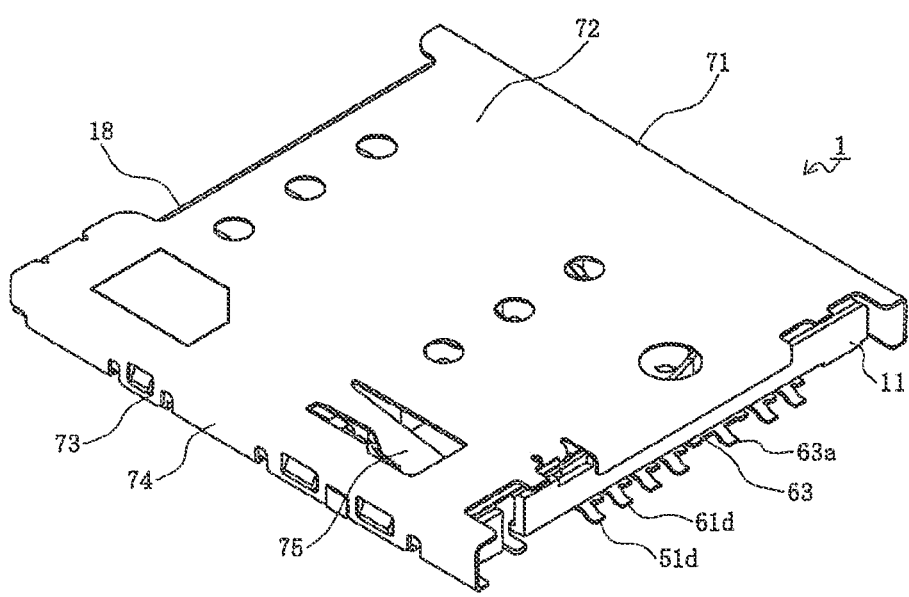
FIG. 2 is a perspective view showing the card connector of FIG. 1.

The shell 71 has an approximately rectangular top plate part 72 and a plurality of side plate parts 74, which arise from a number of places on the side edge of this top plate part 72. A plurality of latching openings 73 are formed in these side plate parts 74. As shown in FIG. 2, when the shell 71 is attached above the housing 11, the latching openings 73 are latched in latching projections 13 formed on the outside surface, such as the side wall part 11e, of this housing 11, and in this way, the shell 71 is fixed to the housing 11.

Moreover, a card detection switch, which detects the rear contact pads 151 and the front contact pads 161, as well as the rear terminals 51 and the front terminals 61, touches and detects that the card 101 is loaded in the card connector 1, and is disposed near the front-end edge 11f of the housing 11. A first contact point member 62, installed on the inner wall part 11a, forms this card detection switch. Near it is disposed a second contact point member 63, most of which is embedded in the bottom wall part 11b.

The first contact point member 62 has an attachment part 62a, attached to the inner wall part 11a, a main part 62b with a cantilever shape, the base of which is connected to the attachment part 62a and which extends in the horizontal direction, and a contact part 62c, connected to the free end of this main part 62b. The attachment part 62a is almost parallel with the side surface of the inner wall part 11a. The main part 62b is inclined with respect to the side surface of the inner wall part 11a in the state in which the card 101 is not inserted in the card connector 1. The contact part 62c is disposed so that it projects toward the front side with respect to the direction of insertion of the card 101; that is, in the backward direction. Thus, when the card 101 is inserted, the front end 111f of the card 101 contacts the contact part 62c.

On the other hand, the second contact point member 63 has a flat plate-shaped attachment part 63a, embedded in a part of the bottom wall part 11b on the side of the inner wall part 11b, and a contact part 63b, the base end of which is connected to the attachment part 63a and the tip of which is exposed from the bottom wall part 11b. Moreover, in the state in which the card 101 has not been inserted, as shown in FIG. 3, the main part 62b of the first contact point member 62 touches the contact part 63b of the second contact point member 63. Therefore, the first contact point member 62 and the second contact point member 63 are in contact, and the card detection switch is in the conducting state; that is, on.

However, when the card 101 is inserted and has reached the position in which its rear contact pads 151 and front contact pads 161, and the rear terminals 51 and front terminals 61, are touching, the contact part 62c of the first contact point member 62 is pushed toward the inner wall part 11a and the main part 62b of the first contact point member 62 is separated from the contact part 63b of the second contact point member 63 by the front end 111f of the card 101. Thus, the first contact point member 62 and the second contact point member 63 are not touching, and the card detection switch is in the non-conducting state; that is, off A mistaken insertion prevention convex part 25, as the first part which prevents mistaken insertion, is formed in the end part of the side opposite the side wall part 11e in the front end edge 11f of the housing 11 (the right side in FIG. 3), rising from the bottom wall part 11b. This mistaken insertion prevention convex part 25 has its height dimension designed so that its upper surface is level with the upper surface of the inner wall part 11a and is formed so that it projects backward from the inner wall part 11a. Moreover, a cut-off part 25c, as an inclined part cut diagonally, is formed in the corner part of the inside of the housing 11 in the transverse direction (the left side in FIG. 3) in the rear surface part 25a of the mistaken insertion prevention convex part 25. Furthermore, the rear surface part 25a is a surface extending in the transverse direction of the housing 11—that is, in a direction perpendicular to the direction of insertion of the card 101—but it is a smaller part that the cut-off part 25c. It is placed on the outside end in the transverse direction of the housing 11 (the right side in FIG. 3) in the mistaken insertion prevention convex part 25.

Moreover, an auxiliary cut-off part 25b, cut in a rectangular shape as a step part, is formed in the cut-off part 25c on the inside end in the transverse direction of the housing 11. An auxiliary rear surface part 25d, as a step part parallel to the rear surface part 25a, is formed in this auxiliary cut-off part 25b. Additionally, an insertion opening convex part 26, as the second part which prevents mistaken insertion rising from the bottom wall part 11b, is formed in the side wall part 11e in the rear end edge 11r of the housing 11. The end surface of the inside in the transverse direction of the housing 11, in the insertion opening convex part 26, is almost level with the inside surface part 23g of the card holding part 23a, and defines the side end of the side wall part 11e of the insertion opening 18.

Next, the operation of the card connector 1 with the constitution will be explained. First, the operation when a correct card 101 is inserted will be explained. First, the operation of correct insertion will be explained. In this case, the card 101 is inserted into the card insertion space formed between the housing 11 and the shell 71 from the insertion opening 18 in the back of the card connector 1. Furthermore, the card 101 is inserted in the correct posture; that is, a posture such that the front end 111f faces toward the front end edge 11f of the housing 11, the bottom surface 111a is opposite the bottom wall part 11b, and the upper surface 111b is opposite the top plate part 72 of the shell 71. In this way, the side edge 112 of the card 101 on which the cut-out part 111c is not formed moves along the inside surface part 23g.

Next, when the card 101 is pushed in further, the side edge holding part 23b and the front end holding part 23c of the slide member 23 hold the side edge 112 and the front end 111f of the card 101. Therefore, the card 101 is held by the slide member 23 and moves toward the inner wall part 11a together with the slide member 23. At this time, the pushing force is transmitted to the slide member 23 from the front end 111f of the card 101 through the front end holding part 23c. Moreover, since the slide member 23 compresses the biasing member 82, consisting of a coil spring, the slide member 23 and the card 101 receive the reactive force of the biasing member 82, but since this reactive force is smaller than the pushing force, they move against this reactive force. In this case, the slide member 23 slides along the card guide mechanism holding part 11h and the card 101 moves with the slide member 23. Moreover, the slide member 23 and the card 101 reach the overstroke position, the most advanced position, and are in the overstroke state.

The cut-out part 11c of the card 101 is opposite the cut-out part 25c of the mistaken insertion prevention convex part 25, and in the overstroke state, the cut-out parts 111c and 25c are close to each other or touching. If they are touching, the slide member 23 and the card 101 are prevented from advancing beyond the overstroke position. Moreover, the free end of the pin member 81, engaging the cam grove 22 formed on the upper surface of the slide cam part 21, is latched to part of the cam groove 22 and stops the movement of the slide member 23. Thus, when the slide member 23 is stopped in the overstroke position, the cut-out part 111c of the card 101 touches the cut-out part 25c of the mistaken insertion prevention convex part 25. In this way, the pin member 81 and the cam groove 22 are prevented from receiving the greatest load.

Next, when the pushing of the card 101 is stopped and the pressure released, the slide member 23 and the card 101 move in the direction of separating from the inner wall part 11a—that is, backwards—due to the reactive force of the biasing member 82. Moreover, the slide member 23 and the card 101, as shown in FIG. 5(a), are stopped in the locked position, in which the card 101 is held in a locked state in the card connector 1. This is because the free end of the pin member 81, which engages with the cam grove 22 formed on the upper surface of the slide cam part 21, is latched to part of the cam groove 22 and stops the movement of the slide member 23. Thus, the slide member 23 is stopped in the locked position. Note, in FIG. 5 (a), the depiction of the pin member 81 is omitted for the convenience of the explanation.

The card 101, now in the locked state, is in a state in which sending and receiving of data can be performed. Furthermore, with the card 101 as such, the contact parts 51c and 61c of the rear terminals 51 and front terminals 61 of the card connector 1 contact the rear contact pads 151 and front contact pads 161 of the card 101 and current is conducted. Moreover, the contact part 62c of the first contact point member 62 of the card detection switch is displaced by being pushed forward by the front end 111f of the card 101, and the main part 62b is separated from the contact part 63b of the second contact point member 63. Thus, the first contact point member 62 and the second contact point member 63 do not touch, and the card detection switch is off.

Incidentally, when the card 101 is pushed, it is pushed from the rear end 111r of the card 101. If the bottom wall part 11b of the housing 11 were formed longer in the forward-backward direction, the position of the rear end edge 11r would be behind the position of the rear end 111r of the card 101, which is being held in the locked state. If so, when the card 101 is pushed, and it advances to the overstroke position, in front of the locked position, the user would touch the rear end edge 11r of the housing 11 and the pushing operation would be difficult to perform. That is, the operability would be lowered. However, with the card connector in this working embodiment, as mentioned above, it is not necessary for the part behind the rear terminals 51 to be fixed by being embedded in the bottom wall part 11b. Therefore, the rear terminals 51 can be disposed in a position near the rear end edge 11r. Thus, the distance from the rear end edge 11r to the contact parts 51c can be shortened. Further, even if the distance from the rear end 111r of the card 101 to the rear contact pads 151 is short, it is not necessary to insert the rear end 111r of the card 101 further forward than the rear end edge 11r when the card 101 is advanced to the overstroke position. Therefore, the operability is not lowered.

Next, the operation of ejecting the card 101 from the card connector 1 will be explained. First, when the card 101 is pushed, the slide member 23 and the card 101 are moved from the locked position towards the inner wall part 11a. Moreover, the slide member 23 and the card 101 reach the overstroke position, which is the most advanced position, and are in the overstroke state. Next, when the pushing of the card 101 is stopped and the pressure on the card 101 is released, the slide member 23 and the card 101, which are in the overstroke position, are moved in the direction of separating from the inner wall part 11a, in the opposite direction from the insertion direction. Moreover, the slide member 23 and the card 101 pass through the locked position and move further back, and the card 101 is ejected from the insertion opening 18.

Next, the operation of mistaken insertion will be explained. First, as the first mistaken insertion, the mistaken insertion in an incorrect posture in which the card 101 is upside down will be explained, as shown in FIG. 5(b). In this case, the card 101 is inserted in a posture such that the front end 111f faces toward the front end edge 11f of the housing 11, the top surface 111b is opposite the bottom wall part 11b, and the lower surface 111a is opposite the top plate part 72 of the shell 71. In this way, the side edge 112 of the card 101 on which the cut-out part 111c is not formed moves along the inside surface part 23g.

Next, when the user pushes the card 101 in further, the side edge holding part 23b and the front end holding part 23c of the slide member 23 hold the side edge 112 and the front end 111f of the card 101; therefore, the card 101 is held by the slide member 23 and moves toward the inner wall part 11a together with the slide member 23. Furthermore, the length of the front end holding part 23c is designed to be such that, even when the card 101 is inserted mistakenly in an incorrect posture in which it is upside down, at least its front end touches in a range outside the cut-out part 11c in the front end 111f.

However, when the card 101 advances a certain extent, as shown in FIG. 5(b), the end of the side opposite the cut-out part 111c in the front end 111f of the card 101 (the right side in FIG. 5(b)) touches the rear surface part 25a of the mistaken insertion prevention convex part 25, and therefore the advance of the card 101 is stopped. That is, the card 101 is stopped by its front end 111f touching the rear surface part 25a of the mistaken insertion prevention convex part 25. The position of the card 101 in this case, that is, the stopped position of the card 101 due to its touching the rear surface part 25a of the mistaken insertion prevention convex part 25, is in a position further forward in the direction of insertion than the locked position shown in FIG. 5(a), that is, in a position distant from the inner wall part 11a, and the front end 111f of the card 101 is in a position in which it does not touch the contact part 62c of the first contact point member 62 of the card detection switch. Therefore, the main part 62b of the first contact point member 62 maintains its contact with the contact part 63b of the second contact point member 63, and the first contact point member 62 and the second contact point member 63 are in contact; the card detection switch stays on.

In other words, the mistaken insertion in an incorrect posture in which the card 101 is upside down is prevented by the fact that the front end 111f of the card 101 touches the rear surface part 25a of the mistaken insertion prevention convex part 25. In this case, the card detection switch does not detect the insertion of the card 101, either. Moreover, since the card 101 is stopped without reaching the locked position, let alone the overstroke position, the user stops the operation of pushing the card 101 and the pressure on the card 101 is released, whereupon the card 101 is moved backward by the reactive force of the biasing member 82 and ejected from the insertion opening 18.

Figures 6A, 6B:
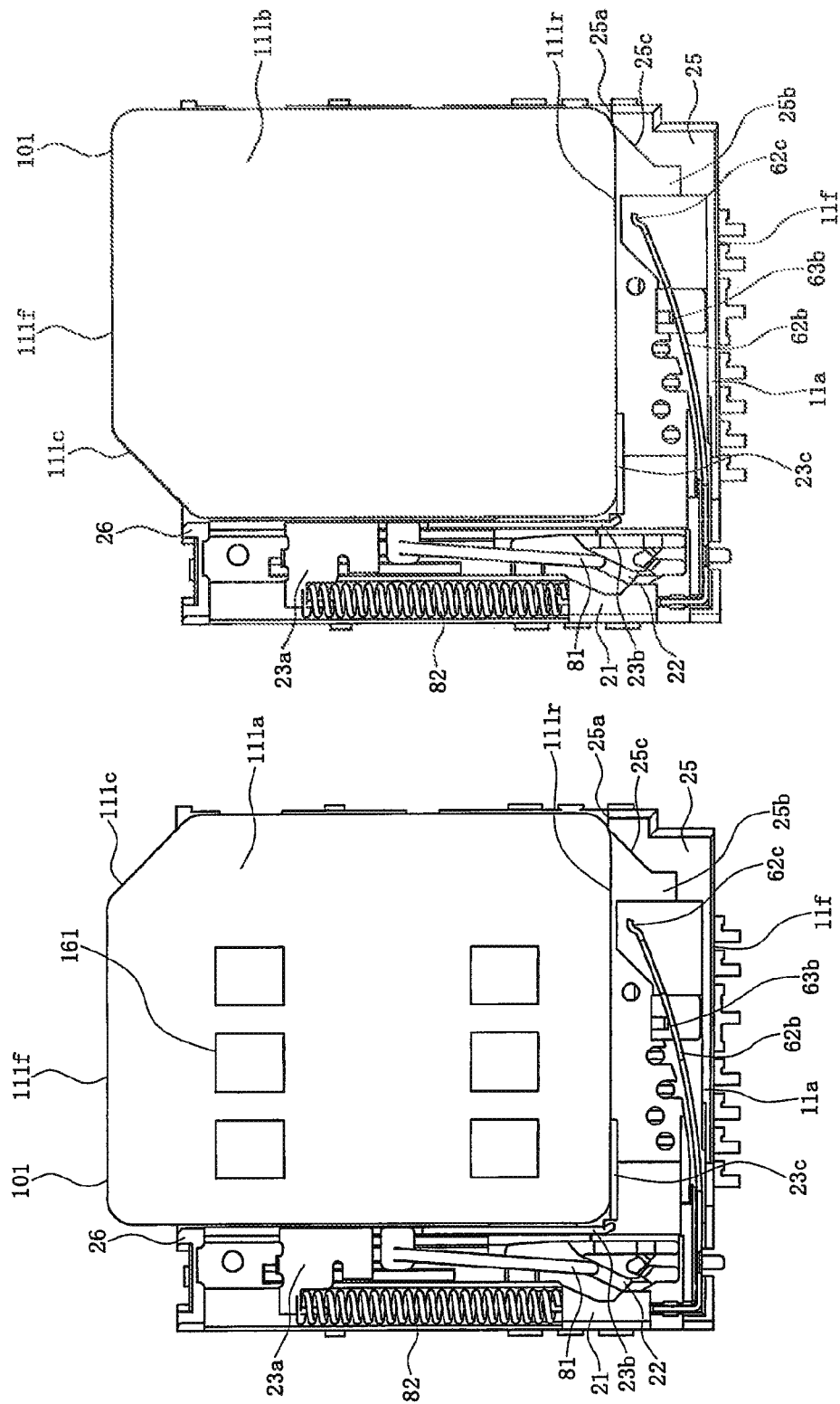
FIG. 6 is a second front view of the card connector of FIG. 1 with the shell removed, showing the operation of inserting a correct kind of card, in which (a) is a view showing a second operation of mistaken insertion, and (b) is a view showing a third operation of mistaken insertion.

Next, as the second mistaken insertion, the mistaken insertion in an incorrect posture in which the card 101 is upside down and its front and back ends are reversed will be explained, as shown in FIG. 6(a). In this case, the card 101 is inserted in a posture such that the rear end 111r faces toward the front end edge 11f of the housing 11, the top surface 111b is opposite the bottom wall part 11b, and the lower surface 111a is opposite the top plate part 72 of the shell 71. In this way, the side edge 112 of the card 101 moves along the inside surface part 23g in which the cut-out part 111c is not formed.

Next, when the user pushes the card 101 in further, the side edge holding part 23b and the front end holding part 23c of the slide member 23 hold the side edge 112 and the rear end 111r of the card 101; therefore, the card 101 is held by the slide member 23 and moves toward the inner wall part 11a together with the slide member 23. However, when the card 101 advances a certain extent, as shown in FIG. 6(a), the end of the side opposite the slide part 23 in the rear end 111r of the card 101 (the right side in FIG. 6(a)) touches the rear surface part 25a of the mistaken insertion prevention convex part 25, and therefore the advance of the card 101 is stopped. That is, the card 101 is stopped by its front end 111f touching the rear surface part 25a of the mistaken insertion prevention convex part 25. The position of the card 101 in this case, that is, the stopped position of the card 101 due to its touching the rear surface part 25a of the mistaken insertion prevention convex part 25, is in a position further forward in the direction of insertion than the locked position shown in FIG. 5(a), that is, in a position distant from the inner wall part 11a, and the rear end 111r of the card 101 is in a position in which it does not touch the contact part 62c of the first contact point member 62 of the card detection switch. Therefore, the main part 62b of the first contact point member 62 maintains its contact with the contact part 63b of the second contact point member 63, and the first contact point member 62 and the second contact point member 63 are in contact; the card detection switch stays on.

In other words, the mistaken insertion in an incorrect posture in which the card 101 is upside down and its front and back ends are reversed is prevented by the fact that the rear end 111r of the card 101 touches the rear surface part 25a of the mistaken insertion prevention convex part 25. In this case, the card detection switch does not detect the insertion of the card 101, either. Moreover, since the card 101 is stopped without reaching the locked position, let alone the overstroke position, the user stops the operation of pushing the card 101 and the pressure on the card 101 is released, whereupon the card 101 is moved backward by the reactive force of the biasing member 82 and ejected from the insertion opening 18.

Next, as the third mistaken insertion, the mistaken insertion in an incorrect posture in which front and back ends of the card 101 are reversed will be explained, as shown in FIG. 6(b). In this case, the card 101 is inserted in a posture such that the rear end 111r faces toward the front end edge 11f of the housing 11, the bottom surface 111a is opposite the bottom wall part 11b, and the upper surface 111b is opposite the top plate part 72 of the shell 71. In this way, the side edge 112 of the card 101 on which the cut-out part 111c is not formed moves along the inside surface part 23g.

Next, when the user pushes the card 101 in further, the side edge holding part 23b and the front end holding part 23c of the slide member 23 hold the side edge 112 and the rear end 111r of the card 101; therefore, the card 101 is held by the slide member 23 and moves toward the inner wall part 11a together with the slide member 23. However, when the card 101 advances a certain extent, as shown in FIG. 6(b), the end of the side opposite the slide part 23 in the rear end 111r of the card 101 (the right side in FIG. 6(b)) touches the rear surface part 25a of the mistaken insertion prevention convex part 25, and therefore the advance of the card 101 is stopped. That is, the card 101 is stopped by its rear end 111r touching the rear surface part 25a of the mistaken insertion prevention convex part 25. The position of the card 101 in this case, that is, the stopped position of the card 101 due to its touching the rear surface part 25a of the mistaken insertion prevention convex part 25, is in a position further forward in the direction of insertion than the locked position shown in FIG. 5(a), that is, in a position distant from the inner wall part 11a, and the rear end 111r of the card 101 is in a position in which it does not touch the contact part 62c of the first contact point member 62 of the card detection switch. Therefore, the main part 62b of the first contact point member 62 maintains its contact with the contact part 63b of the second contact point member 63, and the first contact point member 62 and the second contact point member 63 are in contact; the card detection switch stays on.

In other words, the mistaken insertion in an incorrect posture in which the front and back ends of the card 101 are reversed is prevented by the fact that the rear end 111r of the card 101 touches the rear surface part 25a of the mistaken insertion prevention convex part 25. In this case, the card detection switch does not detect the insertion of the card 101, either. Moreover, since the card 101 is stopped without reaching the locked position, let alone the overstroke position, the user stops the operation of pushing the card 101 and the pressure on the card 101 is released, whereupon the card 101 is moved backward by the reactive force of the biasing member 82 and ejected from the insertion opening 18. Thus, since the mistaken insertion prevention convex part 25 is formed in the housing 11 of the card connector 1, mistaken insertion of the card 101 in incorrect postures is reliably prevented.

Next, the operation when a card of an incorrect kind is inserted will be explained. There are many kinds of cards other than the kinds of cards which are the original objects of the card connector 1 in this working embodiment, that is, cards of incorrect kinds However, the cards of incorrect kinds which can be mistakenly inserted in the card connector 1 are essentially limited to cards of the same size or smaller than the cards of correct kinds Moreover, the cards of incorrect kinds which can be easily confused by users with cards of correct kinds are thought to be cards of the same size as the cards of correct kinds. In particular, cards of incorrect kinds which have the same length dimensions as the cards of correct kinds but have smaller width dimensions, if inserted deeply into the card connector 1, will not have stable postures; therefore, they may be caught in the housing 11, etc., and may be impossible to remove. Therefore, in this working embodiment, since micro SIM cards have been explained as ones of the correct kind, the card of an incorrect kind will be taken as a microSD card; it will be explained as incorrect card 201.

This incorrect card 201, as shown in the drawings, has a overall approximately rectangular plate shape; a plurality of contact pads 261, as electrode pads which are the terminal members, are disposed in a line along the front end 211f, on the lower surface 211a of the part toward the front end 211f. That is, the electrode pads are disposed in such a way that they form 1 line extending in the transverse direction of the incorrect card 201. Furthermore, no contact pads 261 are disposed on the upper surface 211b. In addition, a cut-off part 211c, as an inclined part cut diagonally, is formed one corner connecting the left and right ends of the front end 211f and the side edge 212, specifically, in the upper right corner in the upper surface 211b. Moreover, the length dimension of the incorrect card 201, which is a microSD card (the distance between the front end 211f and the rear end 211r) is approximately 15.0 mm, the same as the card 101, which is a micro SIM card, and the width dimension (the distance between the left and ride edges 212) is approximately 11.0 mm, smaller than the card 101.

First, as the first mistaken insertion of the incorrect card 201, as shown in FIG. 7(a), the case will be explained in which the incorrect card 201 is inserted from the insertion opening 18 of the card connector 1, against the side of the slide member 23, in the same posture as the correct posture of the card 101, that is, the incorrect card 201 is inserted with the front end 211f facing toward the front end edge 11f of the housing 11, the bottom surface 211a opposite the bottom wall part 11b, and the upper surface 211b opposite the top plate part 72 of the shell 71. In this case, the incorrect card 201 advances with the side edge 212 on which the cut-out part 211c is formed along the inside surface part 23g of the slide member 23, but since the width dimension of the incorrect card 201 is smaller than the card 101, a gap is formed between the side plate part 74 of the shell 71 and the side edge 212 of the incorrect card 201 on the opposite side to the slide member 23 (the right side in FIG. 7(a)). That is, although the inside surface part 23g of the slide member 23 and the side edge 212 of the incorrect card 201 touch or are close to each other on the side of the slide member 23 (the left side in FIG. 7(a)), the side plate part 74 of the shell 71 and the side edge 212 of the incorrect card 201 are greatly separated on the side opposite the slide member 23.

Next, when the user pushes the card 101 in further, since the inside surface part 23g and the front end holding part 23c of the slide member 23 hold the side edge 212 and the front end 211f of the incorrect card 201, the incorrect card 201 is held by the slide member 23 and moves toward the inner wall part 11a together with the slide member 23. However, when the incorrect card 201 advances a certain amount, as shown in FIG. 7(a), the advance of the incorrect card 201 is stopped by the fact that the end of the incorrect card 201 on the opposite side from the cut-out part 211c in the front end 211f (the right side in FIG. 7(a)) touches the cut-out part 25c of the mistaken insertion prevention convex part 25. That is, the incorrect card 201 is stopped by its front end 211f touching the cut-out part 25c of the mistaken insertion prevention convex part 25. The position of the incorrect card w01 in this case, that is, the stopped position of the card 201 due to its touching the cut-out part 25c of the mistaken insertion prevention convex part 25, or the stopped position of the slide member 23 holding the incorrect card 201, is in a position further forward in the direction of insertion than the locked position, that is, in a position distant from the inner wall part 11a. Furthermore, the front end 211f of the incorrect card 201 is in a position in which it does not touch the contact part 62c of the first contact point member 62 of the card detection switch. Therefore, the contact part 62c of the first contact point member 62 of the card detection switch is displaced by being pushed forward by the front end 211f of the incorrect card 201 and the main part 62b is separated from the contact part 63b of the second contact point member 63. Thus, the first contact point member 62 and the second contact point member 63 are not touching, and the card detection switch is off.

That is, the mistaken insertion of the incorrect card 201 is stopped by the front end 211f of the incorrect card 201 touching the cut-out part 25c of the mistaken insertion prevention convex part 25. Moreover, since the incorrect card 201 is stopped without reaching the locked position, let alone the overstroke position, the user stops the operation of pushing the card 201 and the pressure on the card 201 is released, whereupon the card 201 is moved backward by the reactive force of the biasing member 82 and ejected from the insertion opening 18.

Next, as the second mistaken insertion of the incorrect card 201, the case will be explained in which the posture of the incorrect card 201 is inclined in the transverse direction, as shown in FIG. 7(b), in the process in which the incorrect card 201 is inserted in the same manner as the first mistaken insertion. In the first mistaken insertion, as shown in FIG. 7(a), a gap is produced between the side plate part 74 of the shell 71 and the side edge 212 of the incorrect card 201, on the opposite side from the slide member 23; therefore, when an external force is applied such that the rear end 211r of the incorrect card 201 is displaced toward the right by some cause, for example, as when a component facing towards the right in FIG. 7(a) is contained in the force which pushes the incorrect card 201 by the user's fingers, the posture of the incorrect card 201 is inclined toward the right, as shown in FIG. 7(b).

When the incorrect card 201 advances a certain extent in this kind of inclined posture, as shown in FIG. 7(b), the advance of the incorrect card 201 is stopped by the fact that the end on the opposite side from the cut-out part 211c in the front end 211f of the incorrect card 201 (the right side in FIG. 7(b)) touches the auxiliary rear surface part 25d in the auxiliary cut-out part 25b of the mistaken insertion prevention convex part 25. That is, the incorrect card 201 is stopped by its front end 211f touching the auxiliary rear surface part 25d of the mistaken insertion prevention convex part 25. Furthermore, the inclination of the incorrect card 201 is limited by the fact that the end of the opposite side from the slide member 23 in its rear end 211r touches the side plate part 74 of the shell 71. That is, as shown in FIG. 7(b), if the end of the opposite side from the slide member 23 in its rear end 211r touches the side plate part 74 of the shell 71, the rear end 211r is not displaced any more than that towards the right.

Moreover, the position of the incorrect card 201 when it is stopped, that is, the stopped position of the incorrect card 201 due to its touching the auxiliary rear surface part 25d of the mistaken insertion prevention convex part 25, or the stopped position of the slide member 23 carrying the incorrect card 201, is in a position further forward in the direction of insertion than the locked position, that is, in a position distant from the inner wall part 11a. Furthermore, the front end 211f of the incorrect card 201 is in a position in which it does not touch the contact part 62c of the first contact point member 62 of the card detection switch. Therefore, the contact part 62c of the first contact point member 62 is displaced by being pushed forward by the front end 211f of the incorrect card 201 and the main part 62b is separated from the contact part 63b of the second contact point member 63. Thus, the first contact point member 62 and the second contact point member 63 are not touching, and the card detection switch is off.

That is, the mistaken insertion of the incorrect card 201 is stopped by the front end 211f of the incorrect card 201 touching the auxiliary rear surface part 25d of the mistaken insertion prevention convex part 25. Moreover, since the incorrect card 201 is stopped without reaching the locked position, let alone the overstroke position, the user stops the operation of pushing the card 201 and the pressure on the card 201 is released, whereupon the card 201 is moved backward by the reactive force of the biasing member 82 and ejected from the insertion opening 18.

Next, as the third mistaken insertion of the incorrect card 201, as shown in FIG. 8(a), the case will be explained in which the incorrect card 201 is inserted from the insertion opening 18 of the card connector 1, against the opposite side of the slide member 23, in the same posture as the correct posture of the card 101, that is, the incorrect card 201 is inserted with the front end 211f facing toward the front end edge 11f of the housing 11, the bottom surface 211a opposite the bottom wall part 11b, and the upper surface 211b opposite the top plate part 72 of the shell 71. In this case, the side edge 212 of the incorrect card 201 on which the cut-out part 211c is not formed advances along the side plate part 74 of the shell 71, but since the width dimension of the incorrect card 201 is smaller than the card 101, a gap is formed between the inside surface part 23g of the slide member 23 and the side edge 212 of the incorrect card 201. That is, although the side plate part 74 of the shell 71 and the side edge 212 of the incorrect card 201 are touching or close to each other on the opposite side from the slide member 23 (the right side in FIG. 8(a)), the inside surface part 23g of the slide member 23 and the side edge 212 of the incorrect card 201 are greatly separated on the side of the slide member 23.

Furthermore, since the front end holding part 23c of the slide member 23 extends over a sufficiently wide range in the transverse direction of the housing 11, the inside surface part 23g of the slide member 23 and the side edge 212 of the incorrect card 201 touch and are held at least at the end on the side of the slide member 23 in the front end 211f of the incorrect card 201, even though they are greatly separated. Therefore, when the user pushes the incorrect card 201 further in, the front end holding part 23c of the slide member 23 holds the front end 211f of the incorrect card 201, and therefore the incorrect card 201 is held by the slide member 23 and moves toward the inner wall part 11a together with the slide member 23.

However, when the incorrect card 201 advances a certain extent, as shown in FIG. 8(a), the end of the side opposite the cut-out part 211c in the front end 211f of the incorrect card 201 (the right side in FIG. 8(a)) touches the rear surface part 25a or the cut-out-part 25c of the mistaken insertion prevention convex part 25, and therefore the advance of the incorrect card 201 is stopped. That is, the incorrect card 201 is stopped by its front end 211f touching the rear surface part 25a or the cut-out part 25c of the mistaken insertion prevention convex part 25. The position of the incorrect card 201 in this case, that is, the stopped position of the card 201 due to its touching the rear surface part 25a or the cut-out part 25c of the mistaken insertion prevention convex part 25, or the stopped position of the slide member 23 holding the incorrect card 201, is in a position further forward in the direction of insertion than the locked position, that is, in a position distant from the inner wall part 11a, and the front end 211f of the incorrect card 201 is in a position in which it does not touch the contact part 62c of the first contact point member 62 of the card detection switch. Therefore, the main part 62b of the first contact point member 62 maintains its contact with the contact part 63b of the second contact point member 63, and the first contact point member 62 and the second contact point member 63 are in contact; the card detection switch stays on.

That is, the mistaken insertion of the incorrect card 201 is stopped by the front end 211f of the incorrect card 201 touching the rear surface part 25a or the cut-out part 25c of the mistaken insertion prevention convex part 25. Moreover, since the incorrect card 201 is stopped without reaching the locked position, let alone the overstroke position, the user stops the operation of pushing the card 201 and the pressure on the card 201 is released, whereupon the card 201 is moved backward by the reactive force of the biasing member 82 and ejected from the insertion opening 18.

Next, as the fourth mistaken insertion of the incorrect card 201, the case will be explained in which the posture of the incorrect card 201 is inclined in the transverse direction, as shown in FIG. 8(b), in the process in which the incorrect card 201 is inserted in the same manner as the third mistaken insertion. In the third mistaken insertion, as shown in FIG. 8(a), a gap is produced between the inside surface part 23g and the side edge 212 of the incorrect card 201, on the side of the slide member 23; therefore, when an external force is applied such that the rear end 211r of the incorrect card 201 is displaced toward the left by some cause, for example, as when a component facing towards the left in FIG. 8(a) is contained in the force which pushes the incorrect card 201 by the user's fingers, the posture of the incorrect card 201 is inclined toward the left, as shown in FIG. 8(b). Furthermore, since the front end holding part 23c of the slide member 23 extends over a sufficiently wide range in the transverse direction of the housing 11, the inside surface part 23g of the slide member 23 and the side edge 212 of the incorrect card 201 touch and are held at least at the end on the side of the slide member 23 in the front end 211f of the incorrect card 201, even though they are greatly separated and the posture of the incorrect card 201 is inclined to the left.

When the incorrect card 201 advances a certain extent in this kind of inclined posture, as shown in FIG. 8(b), the advance of the incorrect card 201 is stopped by the fact that the end on the opposite side from the cut-out part 211c in the front end 211f of the incorrect card 201 (the right side in FIG. 8(b)) touches the auxiliary rear surface part 25d in the rear side part 25a or the cut-out part 25c of the mistaken insertion prevention convex part 25. That is, the incorrect card 201 is stopped by its front end 211f touching the rear side part 25a or the cut-out part 25c of the mistaken insertion prevention convex part 25. Furthermore, the inclination of the incorrect card 201 is limited by the fact that the side edge 212 on the side of the slide member 23 touches the insertion opening convex part 26. That is, as shown in FIG. 8(b), if the side end 212 of the side of the slide member 23 touches the insertion opening convex part 26, the rear end 211r is not displaced any more than that towards the left.

The position of the incorrect card 201 in the case in which it is stopped, that is, the stopped position of the card 201 due to its touching the rear surface part 25a or the cut-out part 25c of the mistaken insertion prevention convex part 25, or the stopped position of the slide member 23 holding the incorrect card 201, is in a position further forward in the direction of insertion than the locked position, that is, in a position distant from the inner wall part 11a, and the front end 211f of the incorrect card 201 is in a position in which it does not touch the contact part 62c of the first contact point member 62 of the card detection switch. Therefore, the main part 62b of the first contact point member 62 maintains its contact with the contact part 63b of the second contact point member 63, and the first contact point member 62 and the second contact point member 63 are in contact; the card detection switch stays on.

That is, the mistaken insertion of the incorrect card 201 is stopped by the front end 211f of the incorrect card 201 touching the rear surface part 25a or the cut-out part 25c of the mistaken insertion prevention convex part 25. Moreover, since the incorrect card 201 is stopped without reaching the locked position, let alone the overstroke position, the user stops the operation of pushing the card 201 and the pressure on the card 201 is released, whereupon the card 201 is moved backward by the reactive force of the biasing member 82 and ejected from the insertion opening 18.

Next, as the fifth mistaken insertion of the incorrect card 201, as shown in FIGS. 9(a) and (b), the case will be explained in which the incorrect card 201 is inserted from the insertion opening 18 of the card connector 1, against the side of the slide member 23, in a posture of the card 201 in which it is upside down, that is, the incorrect card 201 is inserted with the front end 211f facing toward the front end edge 11f of the housing 11, the upper surface 211a opposite the bottom wall part 11b, and the lower surface 211b opposite the top plate part 72 of the shell 71.

In this case, the incorrect card 201 advances with the side edge 212 on which the cut-out part 211c is not formed along the inside surface part 23g of the slide member 23, but since the width dimension of the incorrect card 201 is smaller than the card 101, a gap is formed between the side plate part 74 of the shell 71 and the side edge 212 of the incorrect card 201 on the opposite side to the slide member 23 (the right side in FIGS. 9(a) and (b)). That is, although the inside surface part 23g of the slide member 23 and the side edge 212 of the incorrect card 201 touch or are close to each other on the side of the slide member 23 (the left side in FIGS. 9(a) and (b)), the side plate part 74 of the shell 71 and the side edge 212 of the incorrect card 201 are greatly separated on the side opposite the slide member 23.

Next, when the user pushes the card 101 in further, since the inside surface part 23g and the front end holding part 23c of the slide member 23 hold the side edge 212 and the front end 211f of the incorrect card 201, the incorrect card 201 is held by the slide member 23 and moves toward the inner wall part 11a together with the slide member 23. Moreover, the slide member 23 and the card 201 reach the overstroke position, which is the most advanced position, and are in the overstroke state, as shown in FIG. 9(a).

Since the width dimension of the incorrect card 201 is smaller on the front end 211f than the card 101, due to the presence of the cut-out part 211c, the front end 211f does not touch the mistaken insertion prevention convex part 25 when the side edge 212 on which the cut-out part 211c is not formed advances along the inside surface part 23 of the slide member 23. However, the free end of the pin member 81, which engages with the cam grove 22 formed on the upper surface of the slide cam part 21, is latched to part of the cam groove 22 and stops the movement of the slide member 23; thus, the slide member 23 is stopped in the overstroke position, and therefore, the incorrect card 201 also stops in the overstroke position.

Next, when the user stops the operation of pushing the card 201 and the pressure on the card 201 is released, the slide member 23 and the card 201 move in the direction of separating from the inner wall part 11a, that is, backwards, due to the reactive force of the biasing member 82. Moreover, the slide member 23 and the card 10 are stopped in the locked position, as shown in FIG. 9(b). This is because the free end of the pin member 81, which engages with the cam grove 22 formed on the upper surface of the slide cam part 21, is latched to part of the cam groove 22 and stops the movement of the slide member 23; thus, the slide member 23 is stopped in the locked position.

Moreover, when the incorrect card 201 is held in the locked position and the overstroke position, the contact part 62c of the first contact point member 62 of the card detection switch is displaced by being pushed forward by the front end 211f of the card 201 and the main part 62b is separated from the contact part 63b of the second contact point member 63. Thus, the first contact point member 62 and the second contact point member 63 are not touching, and the card detection switch is off.

However, due to the fact that the incorrect card 201 is held in the locked position, it is in a posture such that the lower surface 211*a* on which the contact pads 261 are disposed is opposite the top plate part 72 of the shell 71, and therefore current does not flow through the contact pads 261 from either the rear terminals 51 or the front terminals 61 of the card connector 1. Therefore, data are not sent and received between the incorrect card 201 and the calculating means, etc., of the electronic device in which the incorrect card 201 and the card connector are mounted.

Moreover, when the user, who has noticed that the incorrect card 201 has been inserted due to the fact that data are not being sent and received, pushes the incorrect card 201 with his or her fingers, the slide member 23 and the incorrect card 201 are moved from the locked position towards the inner wall part 11*a*. Furthermore, when the user pushes the card 101 further, the slide member 23 and the incorrect card 201 reach the overstroke position, which is the most advanced position, and are in the overstroke state.

Therefore, when the user stops the operation of pushing the incorrect card 201, the pressure on the card 201 is released, and the slide member 23 and the incorrect card 201, which are in the overstroke position, are moved in the direction of separating from the inner wall part 11*a*, in the opposite direction from the insertion direction. Moreover, the slide member 23 and the incorrect card 201 pass through the locked position and move further back, and the card 201 is ejected from the insertion opening 18.

That is, the incorrect card 201, the card connector 1, and the electronic device in which the card connector 1 is mounted do not perform a wrong operation even though the incorrect card 201 is mistakenly inserted, simply because the operation in the case in which the card 101 is inserted is not performed. Moreover, by performing the same pushing operation as in the case in which the card 101 is ejected, the incorrect card 201 is moved backward and ejected from the insertion opening 18.

Figure 10:
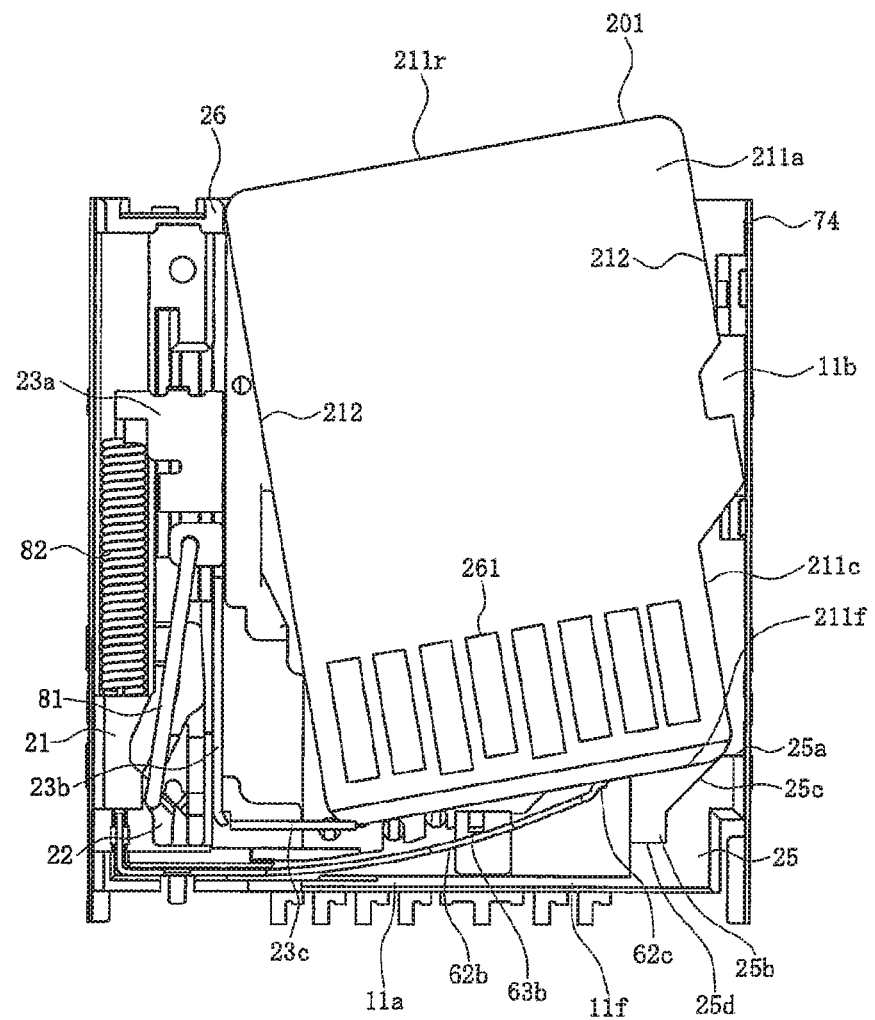
FIG. 10 is a fourth front view of the card connector of FIG. 1 with the top plate part of the shell removed, showing the operation of inserting an incorrect kind of card.
Figure 11:
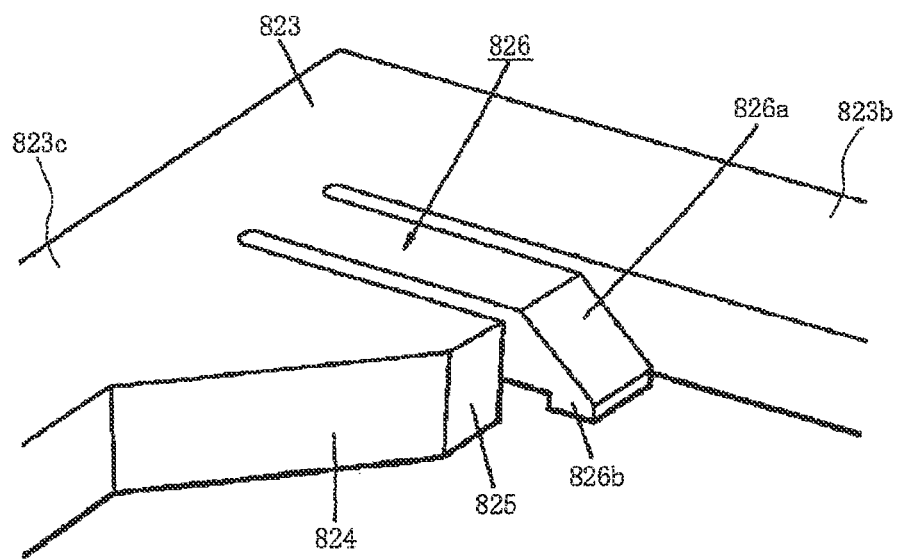
FIG. 11 is a perspective view of a portion of the slider of a conventional card connector.

Next, as the sixth mistaken insertion of the incorrect card 201, the case will be explained in which the posture of the incorrect card 201 is inclined in the transverse direction, as shown in FIG. 10, in the process in which the incorrect card 201 is inserted from the insertion hole 18 of the card connector 1, against the side opposite to the slide member 23, opposite to the fifth mistaken insertion, but in a posture in which the incorrect card 201 is upside down, in the same manner as the fifth mistaken insertion mentioned above. In this case, a gap is produced between the inside surface part 23*g* and the side edge 212 of the incorrect card 201 on the side of the slide member 23; therefore, when an external force is applied such that the rear end 211*r* of the incorrect card 201 is displaced toward the left by some cause, for example, as when a component facing towards the left in FIG. 10 is contained in the force which pushes the incorrect card 201 by the user's fingers, the posture of the incorrect card 201 is inclined toward the left, as shown in FIG. 10.

Furthermore, since the front end holding part 23*c* of the slide member 23 extends over a sufficiently wide range in the transverse direction of the housing 11, the inside surface part 23*g* of the slide member 23 and the side edge 212 of the incorrect card 201 touch and are held at least at the end on the side of the slide member 23 in the front end 211*f* of the incorrect card 201, even though they are greatly separated and the posture of the incorrect card 201 is inclined to the left.

When the incorrect card 201 advances a certain extent in this kind of inclined posture, as shown in FIG. 10, the advance of the incorrect card 201 is stopped by the fact that the end on the side of the cut-out part 211*c* in the front end 211*f* of the incorrect card 201 (the right side in FIG. 10) touches the rear surface part 25*a* or the cut-out part 25*c* of the mistaken insertion prevention convex part 25. That is, the incorrect card 201 is stopped by its front end 211*f* touching the rear surface part 25*a* or the cut-out part 25*c* of the mistaken insertion prevention convex part 25. Furthermore, the inclination of the incorrect card 201 is limited by the fact that the side edge 212 on the side of the slide member 23 touches the insertion opening convex part 26. That is, as shown in FIG. 10, if the side end 212 of the side of the slide member 23 touches the insertion opening convex part 26, the rear end 211*r* is not displaced any more than that towards the left.

Moreover, the position of the incorrect card 201 in the case in which it is stopped, that is, the stopped position of the card 201 due to its touching the rear surface part 25*a* or the cut-out part 25*c* of the mistaken insertion prevention convex part 25, or the stopped position of the slide member 23 holding the incorrect card 201, is in a position further forward in the direction of insertion than the locked position, that is, in a position distant from the inner wall part 11*a*, and the front end 211*f* of the incorrect card 201 is in a position in which it does not touch the contact part 62*c* of the first contact point member 62 of the card detection switch. Therefore, the main part 62*b* of the first contact point member 62 maintains its contact with the contact part 63*b* of the second contact point member 63, and the first contact point member 62 and the second contact point member 63 are in contact; the card detection switch stays on.

That is, the mistaken insertion of the incorrect card 201 is stopped by the front end 211*f* of the incorrect card 201 touching the rear surface part 25*a* or the cut-out part 25*c* of the mistaken insertion prevention convex part 25. Moreover, since the incorrect card 201 is stopped without reaching the locked position, let alone the overstroke position, the user stops the operation of pushing the card 201 and the pressure on the card 201 is released, whereupon the card 201 is moved backward by the reactive force of the biasing member 82 and ejected from the insertion opening 18.

Furthermore, even if the user inserts the incorrect card 201 from the insertion opening 18 of the card connector 1 in a posture other than those explained above, for example, in a posture such that the rear end 211*r* faces in the direction of the front end edge 11*f* of the housing, or he or she inserts it from the insertion opening 18 of the card connector 1 on the slide member 23 side or not pressed against the opposite side from the slide member 23, it can be easily understood from the explanation given above that the mistaken insertion of the incorrect card 201 is stopped, or it can be ejected even if it is mistakenly inserted.

Moreover, in this working embodiment, the constitution of the front terminals 61 of the card 101 was explained as one different from the rear terminals 51, but the constitution of the front terminals 61 may be the same as that of the rear terminals 51.

Furthermore, in this working embodiment, an explanation was given in which the card 101 is provided with front contact pads 161 and rear contact pads 151 and, correspondingly, the card connector 1 has front terminals 61 and rear terminals 51, but the card 101 may also not be provided with front contact pads 161 and only rear contact pads 151; in this case, the card connector 1 may also not have front terminals 61, but only rear terminals 51.

Thus, in this working embodiment, the card connector 1 is provided with a housing 11 which holds a card 101 provided with at least rear contact pads 151, rear terminals 51 which are instealled in this housing 11 and contact at least the rear contact pads 151 of the card 101, a slide member 23 which holds the card 101 which has been inserted into the housing 11 and slides, and a biasing member 82 which biases the slide member 23 in the direction opposite to the direction of insertion; the card connector has a card guiding mechanism, by means of which, when the card 101 is maintained in a state in which it is held in the locked position and the rear contact pads 151 of the card 101 contact the rear terminals 51, and the card 101 is moved in the insertion direction by a pushing action in which the card 101, held in the locked position, is pushed in the insertion direction and it reaches the overstroke position, the card 101 is moved from the overstroke position in the direction opposite to the insertion direction by the biasing member 82 and ejected, and a shell 71 which is attached to the housing 11 and covers at least the housing 11 and part of the card 101 which has been inserted into the housing 11. The slide member 23 includes a side edge holding part 23b which extends towards the front end edge 11f of the housing 11 and a front end holding part 23c which is connected to the front end of the side edge holding part 23b and extends in the transverse direction of the housing 11; it is able to slide forward and backward along one side edge of the bottom wall part 11b of the housing 11, and the housing 11 contains a mistaken insertion prevention convex part 25 which the front end 111f or rear end 111r of a mistakenly inserted card 101 contacts.

In this way, the card connector 1, by means of a simple constitution, can reliably prevent mistaken deep insertion of the right kind of card 101, as well as reliably prevent the mistaken deep insertion of an incorrect card 201 with the same length dimension as the correct kind of card 101 but a smaller width dimension, and reliably remove a mistakenly inserted card 101 or an incorrect card 201; it can also raise the reliability. Furthermore, the mistaken insertion prevention convex part 25 includes cut-off part 25c which is cut diagonally; the card 101 includes a cut-off part 111c which is formed on one end of its front end 111f; when the card is correctly inserted, the cut-off part 111c is opposite the cut-off part 25c of the mistaken insertion prevention convex part 25. In this way, a mistakenly inserted card 101 of the correct kind or an incorrect card 201 touches the mistaken insertion prevention convex part 25 and thus they can be reliably prevented from being inserted deeply into the card connector 1 and reaching the locked or overstroke position. On the other hand, a correctly inserted card 101 of the correct kind can reach the locked or overstroke position without touching the mistaken insertion prevention convex part 25.

Furthermore, at least the tip end of the front end holding part 23c makes contact in a range outside the cut-out part 111c in the front end 111f of a card 101 which has been mistakenly inserted upside down. Since the length of the front end holding part 23c has been designed in this way, the slide member 23 can hold even a card 101 which has been mistakenly inserted upside down, and when the user stops the operation of pushing the card 101, the mistakenly inserted card 101 is reliably ejected by the reactive force of the biasing member 82.

Furthermore, the housing 11 includes an insertion opening convex part 26 formed in the slide member 23 side in the rear end edge 111r; if an incorrect card of a different kind from the card 101, with a narrower width than the card 101, is mistakenly inserted, the insertion opening convex part 26 or the side plate part 74 of the shell 74 contacts the side edge 212 of the incorrect card 201 and controls the inclination of the incorrect card 201 in the transverse direction. In this way, since the inclination of the incorrect card 201 in the transverse direction is controlled, it is not inserted in a posture in which it is not very greatly inclined, even if it is a incorrect card 201 with a narrower width than the card 101, and therefore it is not caught in the card connector 1 and made impossible to remove. Therefore, even if incorrect cards 201 narrower than the card 101 are mistakenly inserted, they can be reliably removed.

While a preferred embodiment of the Present Disclosure is shown and described, it is envisioned that those skilled in the art may devise various modifications without departing from the spirit and scope of the foregoing Description and the appended Claims.

What is claimed is:

1. A card connector, comprising:
   a housing, the housing enclosing a card, the card including terminal members;
   a plurality of contact terminals, each contact terminal being disposed in the housing and contacting the terminal members;
   a card guiding mechanism, the card guiding mechanism guiding the card into and out of the housing; and
   a cover member, the cover member being disposed in the housing and covering the housing and at least part of the card inserted in the housing;
   wherein a slide member includes:
      a side edge holding part which extends towards the front end edge of the housing;
      a front end holding part which is connected to the front end of the side edge holding part and extends in the transverse direction of the housing; and
      a mistaken insertion prevention convex part which is formed on the opposite side of the slide member in the front end edge, and the front end or rear end of a mistakenly inserted card contacts.

2. The card connector of claim 1, in which the mistaken insertion prevention convex part contains an inclined part cut out diagonally.

3. The card connector of claim 2, wherein the card contains an inclined part formed on one end of its front end.

4. The card connector of claim 3, wherein, when the card is correctly inserted, the inclined part is opposite the inclined part of the mistaken insertion prevention convex part.

5. The card connector of claim 4, in which at least the tip of the front end holding part contacts in a range outside the inclined part in the front end of the card which has been inserted upside down.

6. The card connector of claims 5, in which the housing includes an insertion opening convex part formed in the slide member side in the rear end edge.

7. The card connector of claim 6, wherein, if a card is mistakenly inserted, the insertion opening convex part or the side plate part of the cover member contacts the side edge of the incorrect card and controls the inclination of the card in the transverse direction.

8. The card connector of claim 1, in which at least the tip of the front end holding part contacts in a range outside the inclined part in the front end of the card which has been inserted upside down.

9. The card connector of claim 8, in which the housing includes an insertion opening convex part formed in the slide member side in the rear end edge.

10. The card connector of claim 9, wherein, if a card is mistakenly inserted, the insertion opening convex part or the side plate part of the cover member contacts the side edge of the incorrect card and controls the inclination of the card in the transverse direction.

11. The card connector of claim 1, in which the housing includes an insertion opening convex part formed in the slide member side in the rear end edge.

12. The card connector of claim 11, wherein, if a card is mistakenly inserted, the insertion opening convex part or the side plate part of the cover member contacts the side edge of the incorrect card and controls the inclination of the card in the transverse direction.

* * * * *